Oct. 21, 1952  W. H. LONSKEY, SR  2,614,482
DRAIN PAN ATTACHMENT FOR COOKING VESSELS
Filed Nov. 20, 1950  2 SHEETS—SHEET 1
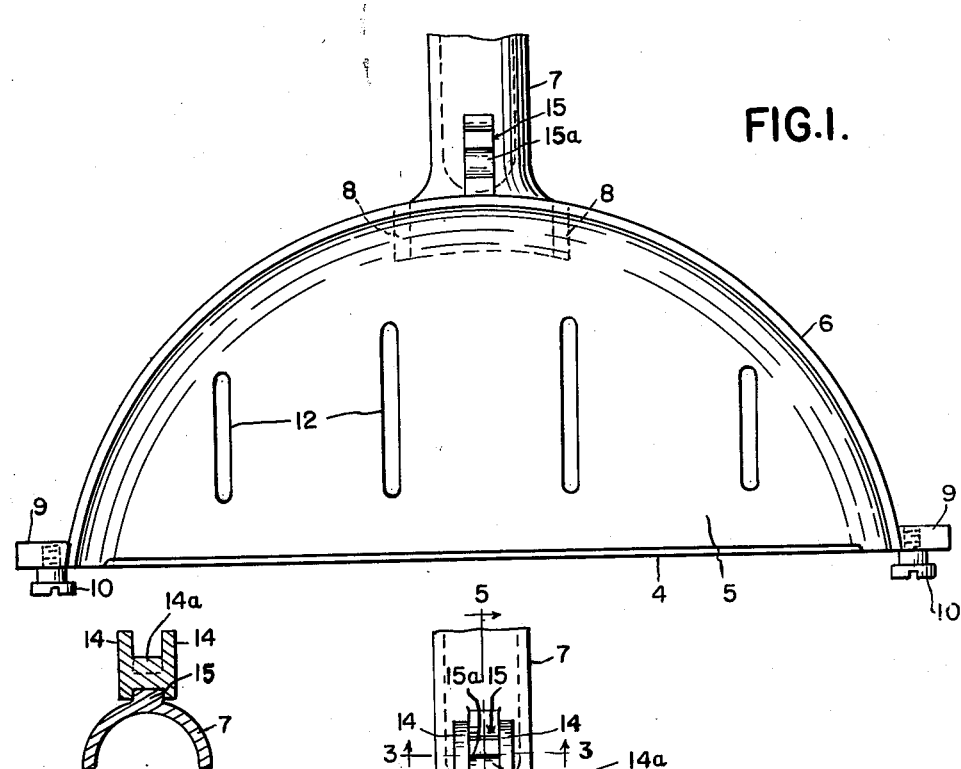
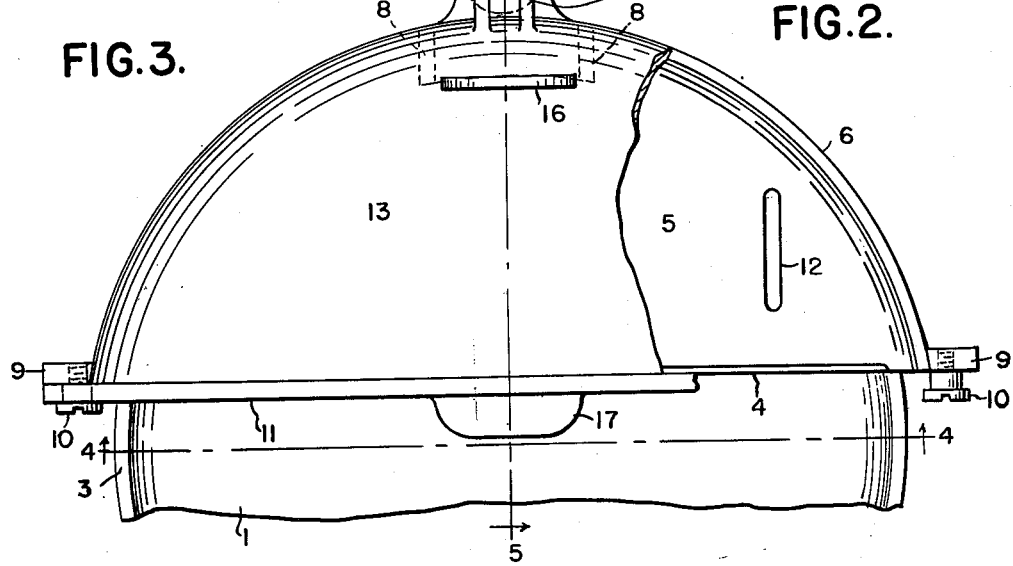
INVENTOR.
WILLIAM H. LONSKEY SR.
BY
J. S. Murray
ATTORNEY Oct. 21, 1952     W. H. LONSKEY, SR     2,614,482
DRAIN PAN ATTACHMENT FOR COOKING VESSELS
Filed Nov. 20, 1950     2 SHEETS—SHEET 2
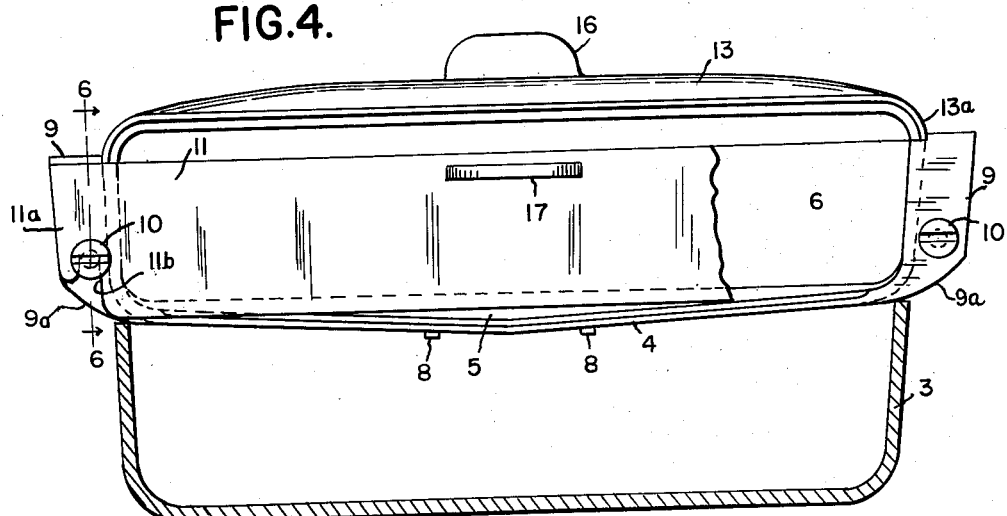
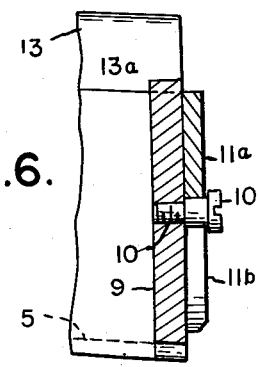
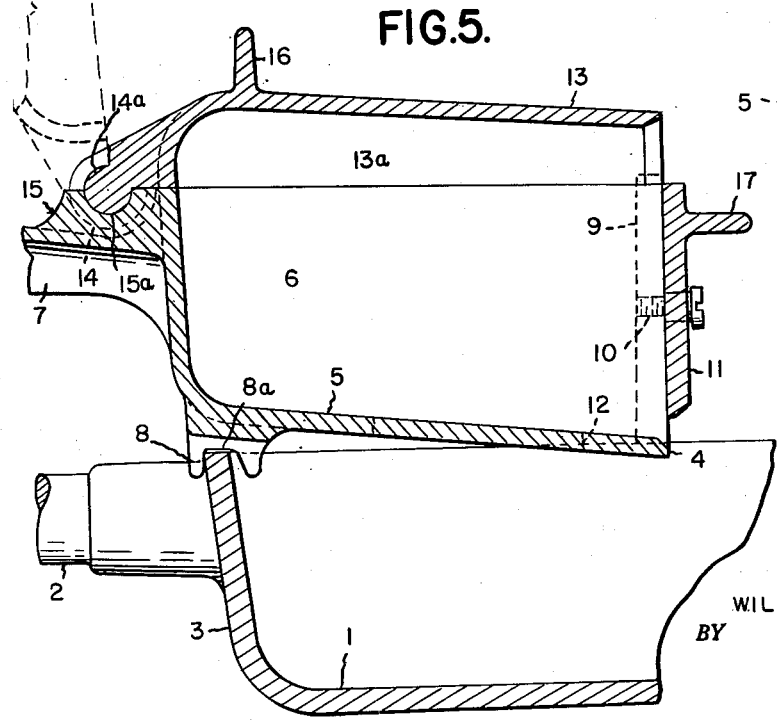
INVENTOR.
WILLIAM H. LONSKEY SR.
BY
J. S. Murray
ATTORNEY Patented Oct. 21, 1952

2,614,482

UNITED STATES PATENT OFFICE 2,614,482

DRAIN PAN ATTACHMENT FOR COOKING VESSELS

William H. Lonskey, Sr., Detroit, Mich.; William H. Lonskey, Jr., administrator of said William H. Lonskey, Sr., deceased Application November 20, 1950, Serial No. 196,602

6 Claims. (Cl. 99—355)

This invention relates to drain pans and particularly pans attachable to skillets and other cooking vessels for draining excess grease from foods cooked in such vessels.

An object of the invention is to adapt a drain pan for attachment to a cooking vessel in a covering relation to such vessel, so that foods occupying the pan may be kept amply warm by heat derived from the supporting vessel.

Another object is to adapt a drain pan to be freely seated in a covering relation to a cooking vessel, and to positively maintain such relation without setting up resistance to lifting the pan from or lowering it to its use position.

Another object is to equip a drain pan with elements suited to retain it in engagement with the rim of a cooking vessel, and further adapted to operatively seat the pan on any flat or moderately inclined surface, for use independently of a cooking vessel.

Another object is to provide a drain pan having an open end from which grease or the like may discharge, and to adapt a closure plate to be readily applied, when desired, to such end to prevent escape of foods occupying the pan.

Another object is to equip a drain pan, serving as a cooking vessel attachment, with a cover to retard the cooling of foods occupying such pan, and to afford said cover an easily releasable hinged connection to the pan, such as will permit uncovering of the foods, without removing the cover from the pan.

Another object is to adapt said cover for use as a crumb tray or sink scraper when not needed as an adjunct to the drain pan.

Another object is to provide a drain pan whereof several may be seated one upon another if necessary to accommodate a quantity of food to be drained.

These and various other objects are attained by the construction hereinafter described and illustrated in the accompanying drawings, wherein:

Fig. 1 is a top plan view of my improved drain pan with its cover and end plate removed.

Fig. 2 is a similar view of the pan, with the cover and end plate applied.

Fig. 3 is a cross sectional view of the drain pan handle, taken on the line 3—3 of Fig. 2.

Fig. 4 is an elevational view taken on the line 4—4 of Fig. 2, showing the outlet end of the drain pan.

Fig. 5 is a radial sectional elevation of the pan, as positioned for use, taken on the line 5—5 of Fig. 2.

Fig. 6 is a fragmentary sectional view of the pan, taken on the line 6—6 of Fig. 4.

In these views, the reference character 1 designates an ordinary skillet or frying pan, having the usual rigidly projecting radial handle 2 and peripheral wall 3. My improved drain pan is preferably of segmental shape, the chordal edge 4 of its bottom 5 being somewhat shorter than the diameter pertaining to its arcuate marginal wall 6, whereby the pan forms somewhat less than a semicircle. A handle 7 integral with the wall 6 projects outward from such wall along a radius bisecting the edge 4. A pair of lugs 8 project integrally downward from the bottom 5 at its juncture with the wall 6, being equidistant from said bisecting radius, and said lugs are upwardly notched at 8a to straddle the skillet wall 3. From the ends of the wall 6 a pair of ribs 9 project outwardly along the chordal edge 4 of the pan, such ribs extending substantially the full height of the wall 6 and having rounded lower edges 9a. Said ribs are adapted to seat on the wall 3, coacting with the lugs 8 to afford the pan a firm support. A pair of headed screws 10 are set permanently in the ribs 9 to removably mount and properly position an elongated plate 11, which may serve as a closure for the chordal or open end of the pan. Thus said plate has its ends 11a reduced in vertical extent to overlap the screws 10 and such ends are upwardly notched at 11b to straddle said screws, the screw heads serving to hold the plate in place. When the described pan properly surmounts a skillet, its bottom inclines materially downward toward its chordal edge, inclining also slightly downward toward the bisector of the edge 4. Thus grease or any other liquid to be drained flows toward said chordal edge and also toward its bisector. It is preferred to form the bottom with a number of drain apertures 12 as an additional escape for a draining liquid, the apertures being shown as slots elongated transversely to the edge 4.

The described pan is equipped with a removable cover 13 corresponding to the segmental shape of the pan, and having its arcuate edge formed with a shallow depending flange or skirt 13a to seat upon the pan wall 6. Said cover, when applied, is held in place partially by the ribs 9, the latter having a slight upward extent beyond the wall 6 to exercise this function. Midway of its arcuate extent, the skirt 13a is integrally and exteriorly formed with a pair of spaced radial hinge lugs 14 of circular form and between these is formed a substantially cylindrical hinge pin 14a, of lesser diameter than said lugs. The axis of said pin and lugs lies in the meeting plane of the skirt 13a and wall 6, and the handle 7 of the pan is integrally surmounted by a boss 15 suited to be straddled by the lugs 14 and having in its top face a semi-circular groove 15a to receive the pin 14a. Thus the cover is hinged to the pan for assuming either its closed or open position shown respectively in full lines and dash lines in Fig. 5, and furthermore is freely removable from the pan. It is preferred to integrally form the cover 13 and plate 11 with lugs 16 and 17 as handles for these parts.

The described attachment may serve a variety of purposes, the draining of grease from fried meats, eggs, or vegetables being a primary one. Also it may be applied to pots and pans to drain water from meats and vegetables, which have been boiled in such vessels. The several points of support afforded by the lugs 8 and ribs 9 are disposed with the view of using the attachment, when desired, independently of any pot or pan. Thus the attachment may rest upon the drainboard of a sink or in a sink, when serving to drain water from fruits or vegetables after washing thereof.

Another advantage of the particular supports carried by the described attachment lies in affording an application of the attachment to several different diameters of cooking vessels. Thus the lateral extent of the ribs 9 is sufficient to allow these to function on at least two different standard diameters of vessels, the notches 8a being large enough to accommodate both diameters. It will be noted also that the spacing of the lugs 8 is sufficient to accommodate between them the handle 2 of a skillet or other vessel 1, this permitting the handle 7 of the drain pan to lie directly above said handle 2, so that both handles may be gripped if it is desired to shift a vessel carrying the attachment from one burner to another.

The cover 13 will frequently be useful as a crumb tray or sink scraper and preferably has its chordal edge beveled to adapt it fully to these added functions.

What I claim is:

1. A drain pan comprising a bottom of approximately segmental form having intersecting inner and outer margins, the outer margin being substantially arcuate, a wall upstanding from said arcuate margin, a handle projecting from the mid portion of such wall, a pair of ribs on the ends of said wall projecting outwardly from the wall, and a closure plate detachably mounted on said ribs and extending along and above the inner margin and having clearance from the bottom for drainage purposes.

2. In a drain pan as set forth in claim 1, a pair of headed pins fixed on said ribs, the closure plate having its ends upwardly notched to straddle the pins, inwardly of their heads.

3. A drain pan for attachment to a cooking vessel, said pan comprising a bottom of approximately segmental form having intersecting inner and outer margins, the outer margin being substantially arcuate, a wall upstanding from the arcuate margin, a handle outwardly projecting from the mid portion of said wall, a lug downwardly projecting from said bottom adjacent to the mid portion of the wall, said lug being upwardly notched to straddle the rim of a cooking vessel, and ribs outwardly projecting from the ends of the wall and vertically elongated on such ends to additionally mount the pan on said rim, said lug and ribs imparting to said bottom a downward inclination from its outer to its inner margin.

4. A drain pan for attachment to a cooking vessel, said pan comprising a bottom of approximately segmental form having intersecting inner and outer margins, the outer margin being substantially arcuate, a wall upstanding from the arcuate margin, a handle outwardly projecting from the mid portion of said wall, a cover corresponding in shape to said bottom and proportioned to seat on the wall, and means for hinging the cover to the inner end portion of the handle, such means including freely separable elements fixed respectively on the handle and cover, whereby the cover is readily detachable from the pan.

5. A drain pan for selective attachment to circular cooking vessels of different diameters, comprising an approximately segmental member having intersecting outer and inner margins, a handle connected to said member substantially midway of its outer margin and outwardly projecting from said member, a lug carried by and beneath and downwardly projecting from said member in proximity to said handle and notched to straddle the rim of a cooking vessel, and a pair of ribs outwardly and oppositely projecting from said member at the ends of its arcuate margin for further seating the member on said rim, the outward extent of said ribs being adequate to adapt the drain pan to cooking vessels materially differing in diameter, said lug and ribs establishing a three-point seating provision for the pan.

6. A drain pan for attachment to a cooking vessel, said pan comprising a bottom of approximately segmental form having intersecting inner and outer margins, the outer margin being substantially arcuate, a wall upstanding from and substantially coextensive with said outer margin, a handle outwardly projecting from the mid portion of said wall, a cover substantially corresponding in shape to said bottom and proportioned to seat on said wall, such cover bridging the ends of said wall, and means for hinging the cover to the inner end portion of the handle, such means including a pair of spaced lugs downwardly projecting from the cover and straddling an inner portion of the handle, and a pin permanently interconnecting the lugs, the handle being transversely formed with an upwardly opening groove receiving said pin.

WILLIAM H. LONSKEY, Sr.

REFERENCES CITED

The following references are of record in the file of this patent:

UNITED STATES PATENTS

| Number | Name | Date |
|---|---|---|
| 414,285 | Burt | Nov. 5, 1889 |
| 1,183,468 | Knight | May 16, 1916 |
| 1,413,579 | Gill | Apr. 25, 1922 |
| 1,672,738 | Stempley | June 5, 1928 |
| 2,066,507 | Yost | Jan. 5, 1937 |
| 2,262,538 | Olson et al. | Nov. 11, 1941 |
| 2,430,582 | Reich | Nov. 11, 1947 |
| 2,507,159 | Holmgren et al. | May 9, 1950 |

FOREIGN PATENTS

| Number | Country | Date |
|---|---|---|
| 2,678 | Great Britain | 1885 |
| 16,975 | Great Britain | 1914 |
| 22,760 | Great Britain | 1914 |
| 332,515 | France | Oct. 30, 1903 |